United States Patent
Jaber et al.

(10) Patent No.: US 8,474,015 B2
(45) Date of Patent: *Jun. 25, 2013

(54) SYSTEM AND METHOD FOR MANAGING FEATURE ENABLEMENT IN AN INFORMATION HANDLING SYSTEM

(75) Inventors: Muhammed K. Jaber, Austin, TX (US); Mukund P. Khatri, Austin, TX (US); Theodore S. Webb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,980

(22) Filed: Mar. 9, 2012

(65) Prior Publication Data
US 2012/0174201 A1 Jul. 5, 2012

Related U.S. Application Data

(63) Continuation of application No. 12/361,090, filed on Jan. 28, 2009, now Pat. No. 8,156,540.

(51) Int. Cl.
*H04L 9/32* (2006.01)
*G06F 17/30* (2006.01)
*G06F 7/04* (2006.01)
*G06F 15/16* (2006.01)
*G06F 15/173* (2006.01)

(52) U.S. Cl.
USPC .............. 726/2; 709/226; 709/202; 709/203; 713/168; 713/171

(58) Field of Classification Search
USPC ............ 713/168, 171; 726/2, 5, 19; 709/203, 709/206
See application file for complete search history.

(56) References Cited

U.S. PATENT DOCUMENTS

| | | | |
|---|---|---|---|
| 5,473,692 A | 12/1995 | Davis | |
| 5,742,757 A | 4/1998 | Hamadani et al. | |
| 5,745,569 A | 4/1998 | Moskowitz et al. | |
| 5,790,664 A | 8/1998 | Coley et al. | |
| 6,978,291 B2 | 12/2005 | Vardi et al. | |
| 7,139,737 B2 | 11/2006 | Takahashi et al. | |
| 7,231,370 B1 | 6/2007 | Kapur | |
| 7,340,769 B2 | 3/2008 | Baugher | |
| 7,590,856 B2 * | 9/2009 | Morino et al. | 713/182 |
| 7,870,312 B2 * | 1/2011 | Thomas | 710/36 |
| 2002/0038265 A1 | 3/2002 | Mertz et al. | |
| 2004/0073517 A1 * | 4/2004 | Zunke et al. | 705/59 |
| 2005/0071273 A1 * | 3/2005 | Vroman et al. | 705/51 |
| 2006/0161972 A1 * | 7/2006 | Cromer et al. | 726/5 |
| 2007/0130080 A1 * | 6/2007 | Kanda | 705/59 |
| 2007/0265976 A1 * | 11/2007 | Helfer et al. | 705/59 |
| 2008/0005029 A1 | 1/2008 | Ando | |
| 2008/0208754 A1 * | 8/2008 | Zunke et al. | 705/59 |

(Continued)

*Primary Examiner* — Joseph Avellino
*Assistant Examiner* — Aftab Nasir Khan
(74) *Attorney, Agent, or Firm* — Larson Newman, LLP

(57) ABSTRACT

A system to manage a key license includes an information handling system having non-volatile memory accessible to a processor. The non-volatile memory stores feature enablement information related to a feature that the information handling system is adapted to provide. The non-volatile memory stores instructions that are accessible to the processor and executable by the processor to send the feature enablement information to an external system after the information handling system is deployed, and to request the feature enablement information, or other feature enablement information, from the external system in response to receiving a request for the information handling system to provide the feature.

20 Claims, 7 Drawing Sheets

U.S. PATENT DOCUMENTS

| | | |
|---|---|---|
| 2008/0256349 A1 | 10/2008 | Dennis et al. |
| 2008/0259555 A1 | 10/2008 | Bechtolsheim et al. |
| 2009/0055835 A1* | 2/2009 | Zhu ............................... 718/105 |
| 2009/0199299 A1* | 8/2009 | McKinnon et al. ............. 726/26 |
| 2009/0217374 A1 | 8/2009 | Liu et al. |
| 2009/0222505 A1 | 9/2009 | Pavan et al. |
| 2009/0271506 A1 | 10/2009 | Arai et al. |
| 2009/0290716 A1 | 11/2009 | O'Connor et al. |
| 2010/0024001 A1* | 1/2010 | Campbell et al. ................. 726/2 |
| 2010/0057674 A1 | 3/2010 | O'Donnell |
| 2010/0104103 A1* | 4/2010 | Guo et al. ..................... 380/278 |

* cited by examiner

SYSTEM AND METHOD FOR MANAGING FEATURE ENABLEMENT IN AN INFORMATION HANDLING SYSTEM

CROSS REFERENCE TO RELATED APPLICATIONS

This application is a continuation of U.S. patent application Ser. No. 12/361,090, entitled "System and Method for Managing Feature Enablement in an Information Handling System," filed on Jan. 28, 2009, the disclosure of which is hereby expressly incorporated by reference in its entirety.

FIELD OF THE DISCLOSURE

This disclosure relates generally to methods and systems for managing feature enablement in an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the disclosed apparatus. Embodiments incorporating teachings of the present disclosure are illustrated and described with respect to the drawings presented herein.

The use of the same reference symbols in different figures indicates similar or identical items.

DETAILED DESCRIPTION

Figure 1:
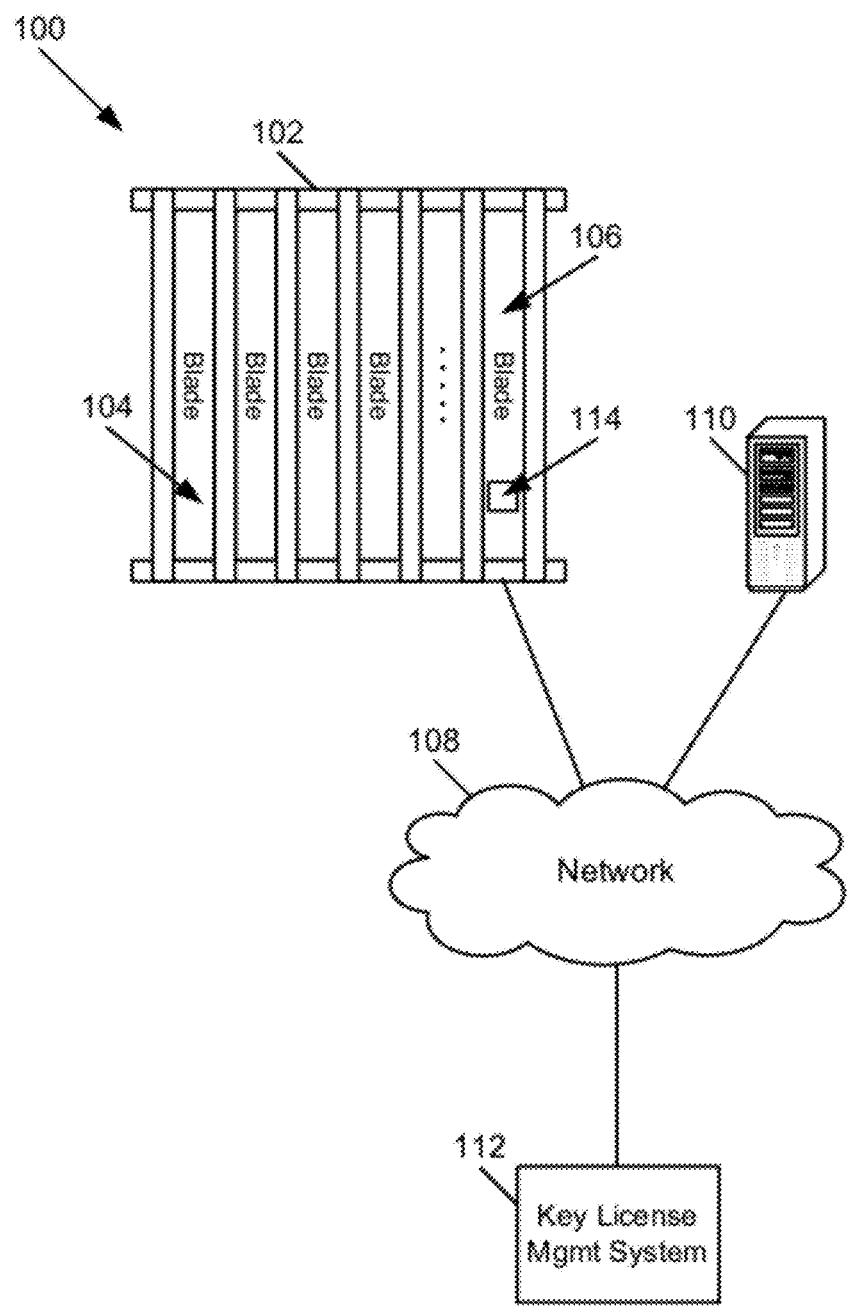
FIG. 1 is a diagram illustrating a particular embodiment of a system to manage feature enablement in an information handling system.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

FIG. 1 illustrates a particular embodiment of a system 100 to manage feature enablement in an information handling system. The system 100 includes a chassis 102. A plurality of information handling systems, such as blade server 104 and blade server 106, are coupled to the server chassis 102. One or more of the information handling systems communicate with a network 108, such as the Internet or a private network, directly or via a network interface at the chassis 102. Another information handling system, such as the other server 110 can also communicate with the network 108. The system 100 also includes a feature enablement information management system, such as a key license management system (KLMS) 112.

In a particular embodiment, the blade server 106 is deployed at the chassis 102 and powers on. The blade server 106 is adapted to detect the KLMS system 112 via a network 108. The blade server 106 is adapted to send feature enablement information 114, to the KLMS system 112 via the network 108. The feature enablement information 114 can include a key license, a digital certificate, a password, a software token, other feature enablement information adapted to prevent unauthorized access to a feature that the blade server 106 is adapted to provide, or any combination thereof. The feature enablement information 114 is stored at non-volatile memory, such as Basic Input/Output System (BIOS) hardware, other platform-level hardware that stores firmware information, or other non-volatile memory, at the blade server 106. Further, the feature enablement information 114 is associated with a feature that the blade server 106 is adapted to provide. In another embodiment, the blade server 106 is adapted to send a plurality of feature enablement information components, such as a plurality of key licenses to the KLMS system 112, where each feature enablement information component is associated with one of a plurality of features that the blade server 106 is adapted to provide, such as an application, utility, service, upgrade or other feature.

The blade server 106 is adapted to receive a request for a feature, such as the feature associated with the feature enablement information 114 sent to the KLMS system 112, or another feature associated with other feature enablement information. For example, the blade server 106 can receive a request from a personal computing device (not shown) via a local area network (not shown) for a particular application or other feature. In response, the blade server 106 is adapted to request feature enablement information related to the requested feature from the KLMS system 112. The blade server 106 is adapted to provide the requested feature to the personal computing device after the feature enablement information related to the requested feature is received from the KLMS system 112. Further, the blade server 106 is adapted to not provide the requested feature when the feature enablement information is not received from the KLMS system 112, such as when a maximum number of key licenses or other feature enablement information components related to the feature are being used by a customer or other party associated with the blade server 106. In an illustrative embodiment, the blade server 106 can be adapted to send an error message to the requesting system when the feature enablement information is not received from the KLMS system 112.

The KLMS system 112 is adapted to detect a deployed information handling system, such as the blade server 106, via the network. In one embodiment, the KLMS system 112 can be adapted to discover the blade server 106. In another embodiment, the blade server 106 can discover the KLMS system 112 and inform the KLMS system 112 that the blade server 106 has been deployed at a customer premises, for example. The KLMS system 112 is adapted to receive and store the feature enablement information 114. Further, the KLMS system 112 is adapted to associate the feature enablement information 114 with a feature that the blade server 106 is adapted to provide. In a particular embodiment, the KLMS system 112 can be adapted to adjust a maximum number of key licenses or other feature enablement information components related to the feature that are available to a customer or other party associated with the blade server 106. For instance, the KLMS system 112 can be adapted to set the maximum number at an integer (e.g., one) or to increment a previous maximum number by an integer.

The KLMS system 112 is adapted to receive a request for the feature enablement information 114. The request can be received from the blade server 106 or another requesting system, such as the other server 110 or the blade server 104. In a particular embodiment, the KLMS system 112 is adapted to determine whether a maximum number of key licenses or other feature enablement information components related to the feature, is being used by the party associated with the blade server 106 or other requesting system. Further, the KLMS system 112 is adapted to not provide the feature enablement information 114 when a maximum number of feature enablement information components is being used for the feature by the party. In a particular embodiment, the KLMS system 112 can be adapted to send an error message to the blade server or other requesting system when it does not provide the feature enablement information.

On the other hand, the KLMS system 112 is adapted to provide the feature enablement information 114 to the requesting system after the KLMS system 112 determines that fewer than a maximum number of key licenses or other feature enablement information components related to the feature is being used by the party. In a particular embodiment, the KLMS system 112 can be adapted to increment a number of key licenses or other feature enablement information components used for the feature by the party after providing the feature enablement information 114 to the requesting system, such as after the feature enablement information 114 is installed at the requesting system. In an illustrative embodiment, the KLMS system 112 can be adapted to determine whether the feature enablement information 114 has been released back to the KLMS system 112 by the requesting system and to decrement the number of key licenses or other feature enablement information components used for the feature by the party.

Figure 2:
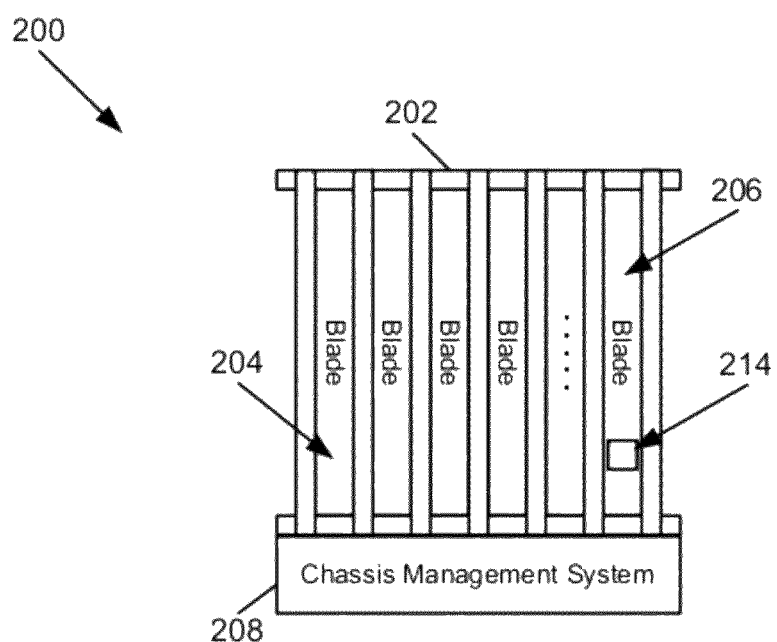
FIG. 2 is a diagram illustrating another particular embodiment of a system to manage feature enablement in an information handling system.

FIG. 2 illustrates another particular embodiment of a system 200 to manage feature enablement in an information handling system. The system 200 includes a chassis 202. A plurality of information handling systems, such as blade server 204 and blade server 206, are coupled to the server chassis 202. One or more of the plurality of information handling systems communicate with a chassis management system 208.

In a particular embodiment, the blade server 206 is deployed at the chassis 202 and powers on. The blade server 206 can be adapted to detect the chassis management system 208. For instance, the blade server 206 can be adapted to discover the chassis management system 208 or to be discovered and contacted by the chassis management system 208. The blade server 206 is adapted to send a key license 214 to the chassis management system 208. In other embodiments, feature enablement information other than a key license can be sent. The key license 214 is stored at non-volatile memory, such as Basic Input/Output System (BIOS) hardware, at the blade server 206. Further, the key license 214 is associated with a feature that the blade server 206 is adapted to provide. In another embodiment, the blade server 206 is adapted to send a plurality of key licenses to the chassis management system 208, where each key license is associated with one of a plurality of features that the blade server 206 is adapted to provide.

The blade server 206 is adapted to receive a request for a feature, such as the feature associated with the key license 214 sent to the chassis management system 208, or another feature associated with another key license. In response, the blade server 206 is adapted to request a key license related to the requested feature from the chassis management system 208. The blade server 206 is adapted to provide the requested feature to a requesting device after the key license related to the requested feature is received from the chassis management system 208. Further, the blade server 206 is adapted to not provide the requested feature when the requested key license is not received from the chassis management system 208.

The chassis management system 208 is adapted to detect a deployed information handling system, such as the blade server 206. In one embodiment, the chassis management system 208 can be adapted to discover the blade server 206. In another embodiment, the blade server 206 can discover the chassis management system 208 and inform the chassis management system 208 that the blade server 206 has been deployed at the chassis 202. The chassis management system 208 is adapted to receive and store the key license 214. Further, the chassis management system 208 is adapted to associate the key license 214 with a feature that the blade server 206 is adapted to provide. In a particular embodiment, the chassis management system 208 can be adapted to adjust a maximum number of key licenses for the feature that are available at the chassis management system 208. For instance, the chassis management system 208 can be adapted to set the maximum number at an integer (e.g., one) or increment a previous maximum number by an integer.

The chassis management system 208 is adapted to receive a request for the key license 214. The request can be received from the blade server 206 or another requesting system, such as the blade server 204. The chassis management system 208 is adapted to determine whether a maximum number of key licenses is being used for the feature. Further, the chassis management system 208 is adapted to not provide the key license 214 when a maximum number of key licenses is being used for the feature. In a particular embodiment, the chassis management system 208 can be adapted to send an error message to the requesting system.

On the other hand, the chassis management system 208 is adapted to provide the key license 214 to the requesting system after the chassis management system 208 determines that fewer than a maximum number of key licenses are being used for the feature. In a particular embodiment, the chassis management system 208 can be adapted to increment a number of key licenses used for the feature after providing the key license 214 to the requesting system. In an illustrative embodiment, the chassis management system 208 can be adapted to determine whether the key license 214 has been released back to the chassis management system 208 by the requesting system and to decrement the number of key licenses used for the feature.

Figure 3:
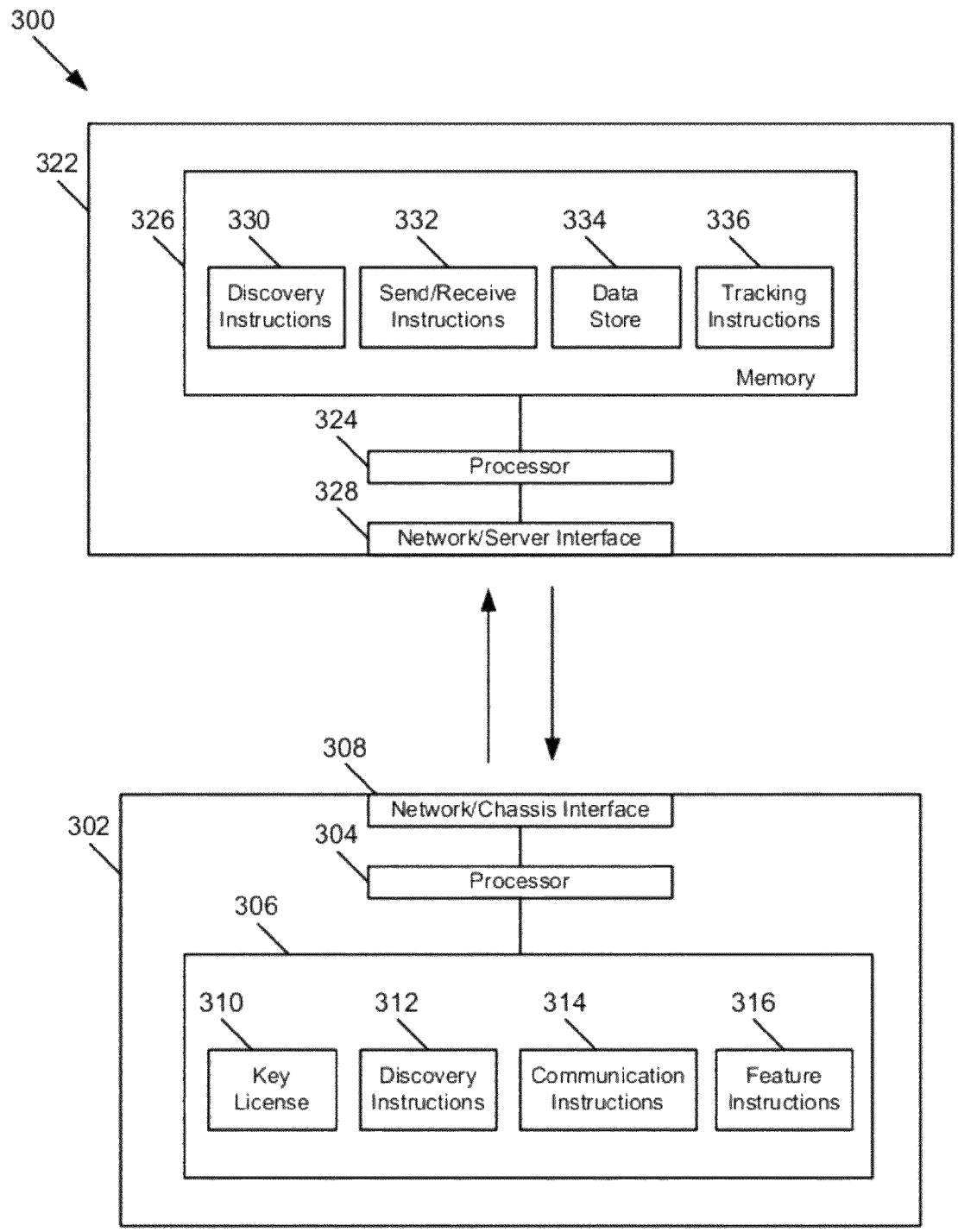
FIG. 3 is a diagram illustrating a further particular embodiment of a system to manage feature enablement in an information handling system.

FIG. 3 illustrates an additional particular embodiment of a system 300 to manage feature enablement in an information handling system. The system 300 includes an information handling system, such as a server 302, which communicates with an external system 322, such as a feature enablement information management system (e.g., the KLMS system 112 illustrated in FIG. 1). In another embodiment, the external system 322 can include a chassis management system (e.g., the chassis management system 208 illustrated in FIG. 2). The server 302 includes a processor 304; non-volatile memory, such as Basic Input/Output System (BIOS) hardware 306 that stores BIOS code accessible to the processor 304; and an interface 308 that facilitates communication between the server 302 and a network, or between the server 302 and a chassis (not shown).

The BIOS hardware 306 includes platform-level instructions that are executable by the processor 304 to perform various functions of the server 302 with respect to managing feature enablement information. For instance, the BIOS hardware 306 can store BIOS code that includes a key license 310 related to a feature. In a particular embodiment, the platform-level hardware/firmware 306 also includes discovery instructions 312 that are executable by the processor 304 to discover the external system 322 via a network, such as the Internet, when the server 302 is deployed. In another embodiment, where the external system 322 is a chassis management system, the discovery instructions 312 can be executable by the processor 304 to discover a feature enablement information management service at the external system 322.

The BIOS hardware 306 also includes communication instructions 314 that are executable by the processor 304 to send the key license 310 to the external system 322. In addition, the communication instructions 314 are executable by the processor 304 to request the key license 310, a similar key license related to the feature, or another key license related to another feature, in response to a request received at the server 302 for a feature. The BIOS hardware 306 includes feature instructions 316 that are executable by the processor 304 to provide the requested feature to a requesting system after the key license related to the requested feature is received from the external system 322. Further, the feature instructions 316 are executable by the processor 304 to not provide the requested feature to the requesting system when the key license is not received from the external system 322, such as when a maximum number of key licenses for the feature are being used. In an illustrative embodiment, the feature instructions 316 can be executable by the processor 304 to send an error message to the requesting system when the key license is not received.

The external system 322 includes processor 324, memory 326 accessible to the processor 324, and a network/server interface 328. In one embodiment, the network/server interface 328 can be a network interface when the external system 322 includes a feature enablement information management system server. In another embodiment, the network/server interface 328 can be a server interface when the external system 322 includes a chassis management system.

In a particular embodiment, the memory 326 can include instructions that are executable by the processor 324 to perform various functions with respect to managing feature enablement information. In other embodiments, the external system 322 can include hardware, software, or any combination thereof, adapted to provide the various functions described.

For example, the memory 326 can include discovery instructions 330 that are executable by the processor 324 to detect a deployed information handling system, such as the information handling system 302. In one embodiment, the discovery instructions 330 can be executable by the processor 324 to discover the information handling system 302. In another embodiment, the discovery instructions 330 can be executable by the processor 324 to detect the information handling system 302 in response to an indication received from the information handling system 302.

In addition, the memory 326 can include send/receive instructions that are executable by the processor 324 to receive the key license 310 (or other feature enablement information) from the information handling system 302 and to store the key license 310 at the data store 334. The key license 310 is associated at the data store 334 with a feature that the information handling system 302 is adapted to provide and can also be associated with a particular customer or other party related to the information handling system 302.

In a particular embodiment, the memory 326 includes tracking instructions that are executable by the processor 324 to adjust a maximum number of key licenses for the feature that are available to a customer or other party related to the information handling system 302. In a particular embodiment, the license tracking instructions are executable by the processor 324 to determine, in response to a request received at the external system 322 for a key license, whether a maximum number of key licenses is being used for the feature by the party associated with a requesting system. The request can be received from the information handling system 302 or another requesting system. The send/receive instructions 332 are executable by the processor 324 to provide the requested key license to the requesting system when fewer than a maximum number of key licenses are being used for the feature by a party associated with the requesting system, and to not provide the requested key license when a maximum number of key licenses is being used for the feature by the party associated with the requesting system.

Figure 4:
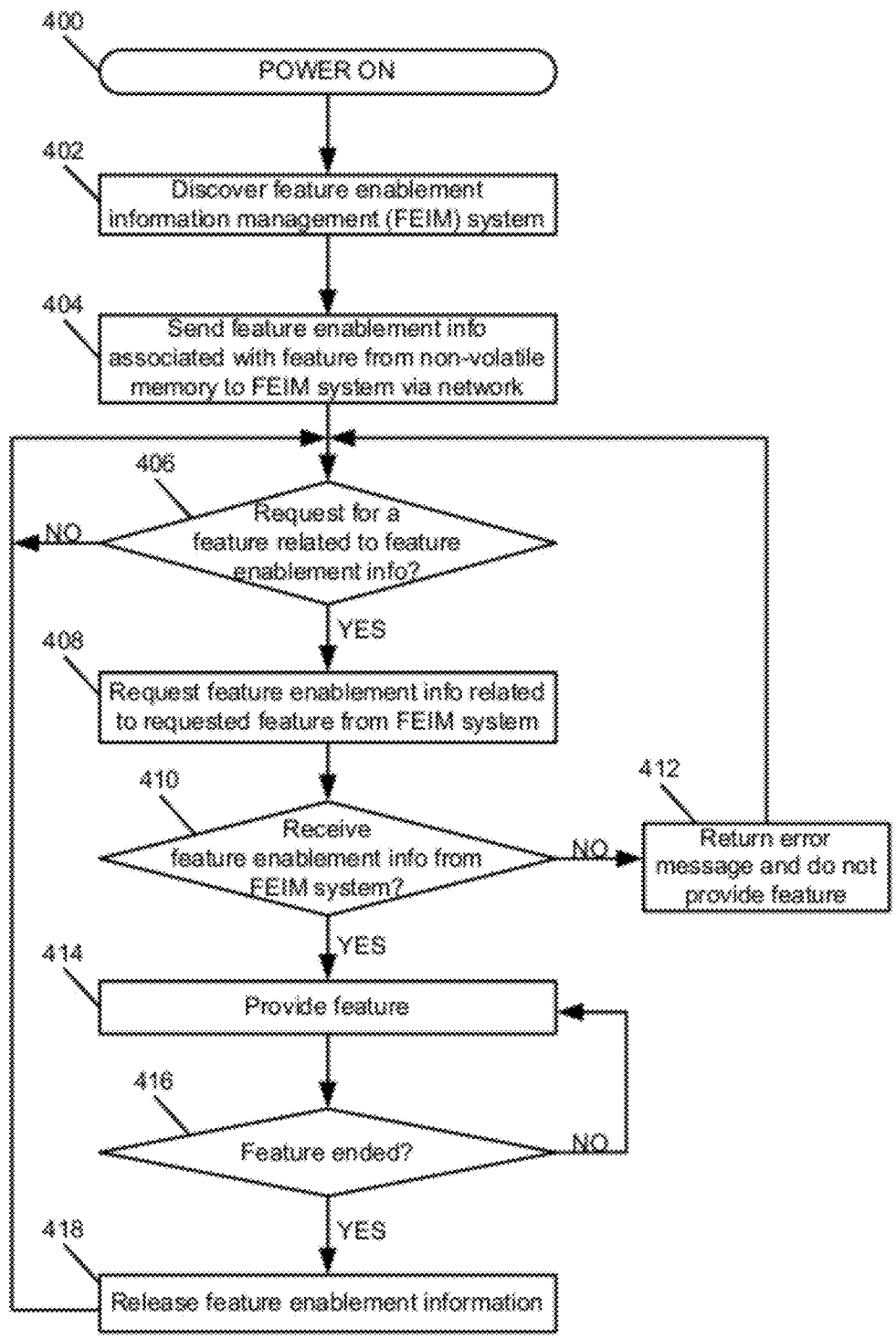
FIG. 4 is a flow diagram illustrating a particular embodiment of a method of managing feature enablement in an information handling system.

FIG. 4 illustrates a particular embodiment of a method of managing feature enablement in an information handling system. At block 400, an information handling system, such as a blade server or other server, powers on. For instance, the information handling system can power on after being deployed in a server chassis. Moving to block 402, the information handling system discovers a feature enablement information management system via a network. In one embodiment, the information handling system can communicate with the network directly. In another embodiment, the information handling system can communicate with the network via an interface to the network at the chassis or via a chassis management system.

Proceeding to block 404, the information handling system sends feature enablement information to the feature enablement information management system via the network. The feature enablement information is stored at non-volatile memory at the information handling system prior to deployment. Further, the feature enablement information is associated with a feature that the information handling system is adapted to provide. Continuing to decision node 406, the information handling system determines whether it has received a request for a feature. The feature can be associated with the feature enablement information sent to the feature enablement information management system at block 404 or can be another feature.

If the information handling system has received such a request, the method advances to 408, and the information handling system requests feature enablement information related to the requested feature from the feature enablement information management system. At decision node 410, the information handling system determines whether it has received from the feature enablement information management system the feature enablement information related to the requested feature. If the information handling system does not receive the feature enablement information associated with the requested feature from the feature enablement information management system, the method moves to block 412, and the information handling system can send an error message to a source of the request for the feature, and the information handling system does not provide the feature. The method can then return to decision node 406.

Returning to decision node 410, if the information handling system determines that it has received the feature enablement information associated with the requested feature, the method moves to block 414, and the information handling system provides the feature. Proceeding to decision node 416, the information handling system can determine whether the feature is no longer being provided. If the feature has not ended, the method returns to decision node 416. Whereas, if the feature is no longer provided, the feature enablement information can be released to the feature enablement information management system at 418, and the method can return to decision node 406.

Figure 5:
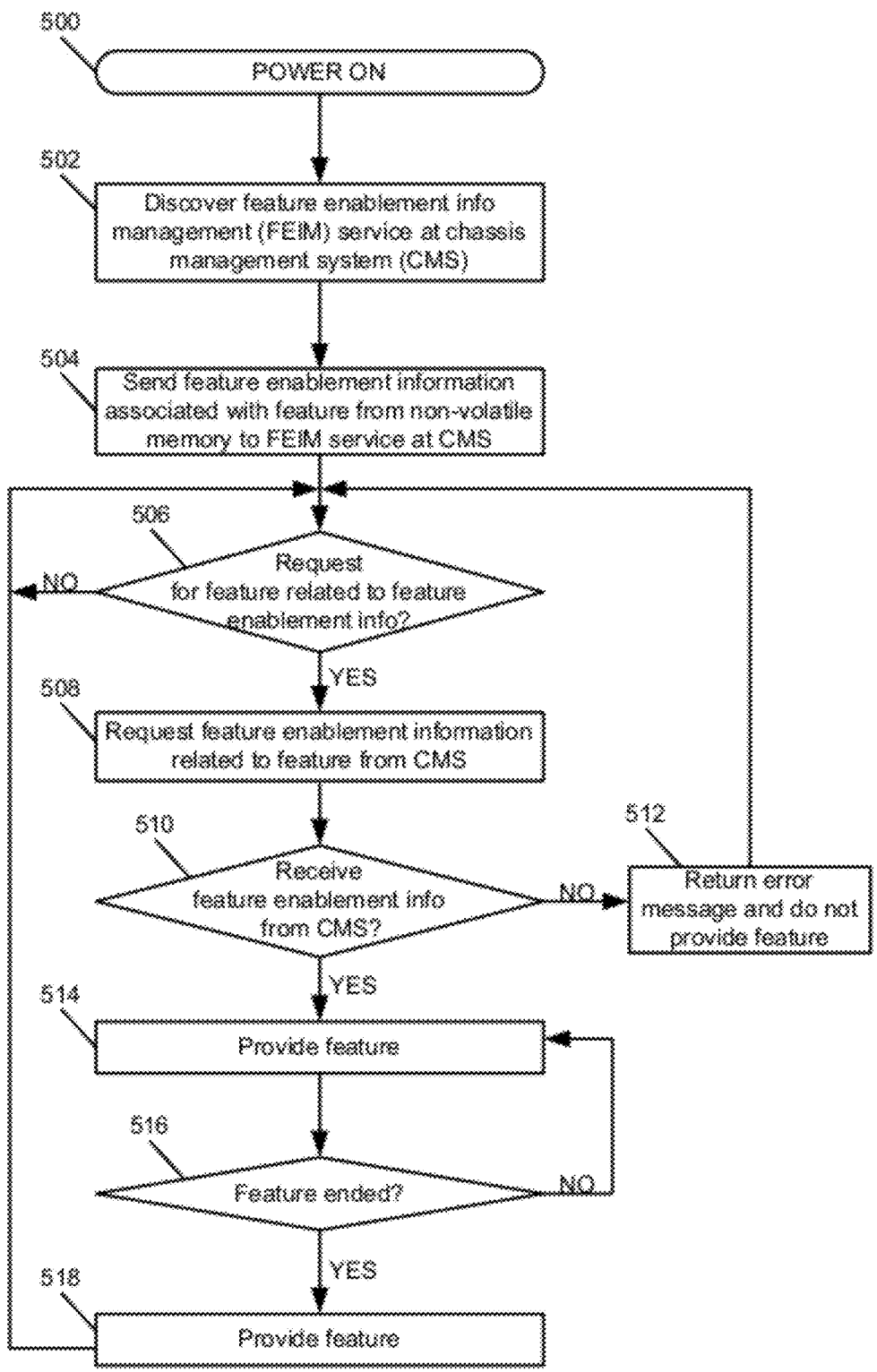
FIG. 5 is a flow diagram illustrating another particular embodiment of a method of managing feature enablement in an information handling system.

FIG. 5 illustrates another particular embodiment of a method of managing feature enablement in an information handling system. At block 500, an information handling system, such as a blade server or other server, powers on after being deployed at a server chassis. Feature enablement information is stored at non-volatile memory, such as Basic Input/Output System (BIOS) hardware, at the information handling system prior to deployment. Further, the feature enablement information is associated with a feature that the information handling system is adapted to provide. Moving to block 502, the information handling system discovers a feature enablement information management service at a chassis management system at the server chassis. Proceeding to block 504, the information handling system sends feature enablement information to the chassis management system (CMS) where it can be stored.

Continuing to decision node 506, the information handling system determines whether it has received a request for a feature. If the information handling system has received such a request, the method advances to 508, and the information handling system requests feature enablement information related to the requested feature, such as the feature enablement information sent at block 504, from the CMS (e.g., via the feature enablement information management service). At decision node 510, the information handling system determines whether it has received from the CMS the feature enablement information related to the requested feature. If the information handling system does not receive the feature enablement information related to the requested feature from the CMS, the method moves to block 512, and the information handling system can send an error message to a source of the request for the feature, and the information handling system does not provide the feature. The method can then return to decision node 506.

Returning to decision node 510, if the information handling system determines that it has received the feature enablement information associated with the requested feature, the method moves to block 514, and the information handling system provides the feature. Proceeding to decision node 516, the information handling system can determine whether the feature is no longer provided. If the feature has not ended, the method returns to decision node 516. Whereas, if the feature is no longer provided, the feature enablement information can be released to the CMS at 518, and the method can return to decision node 506.

Figure 6:
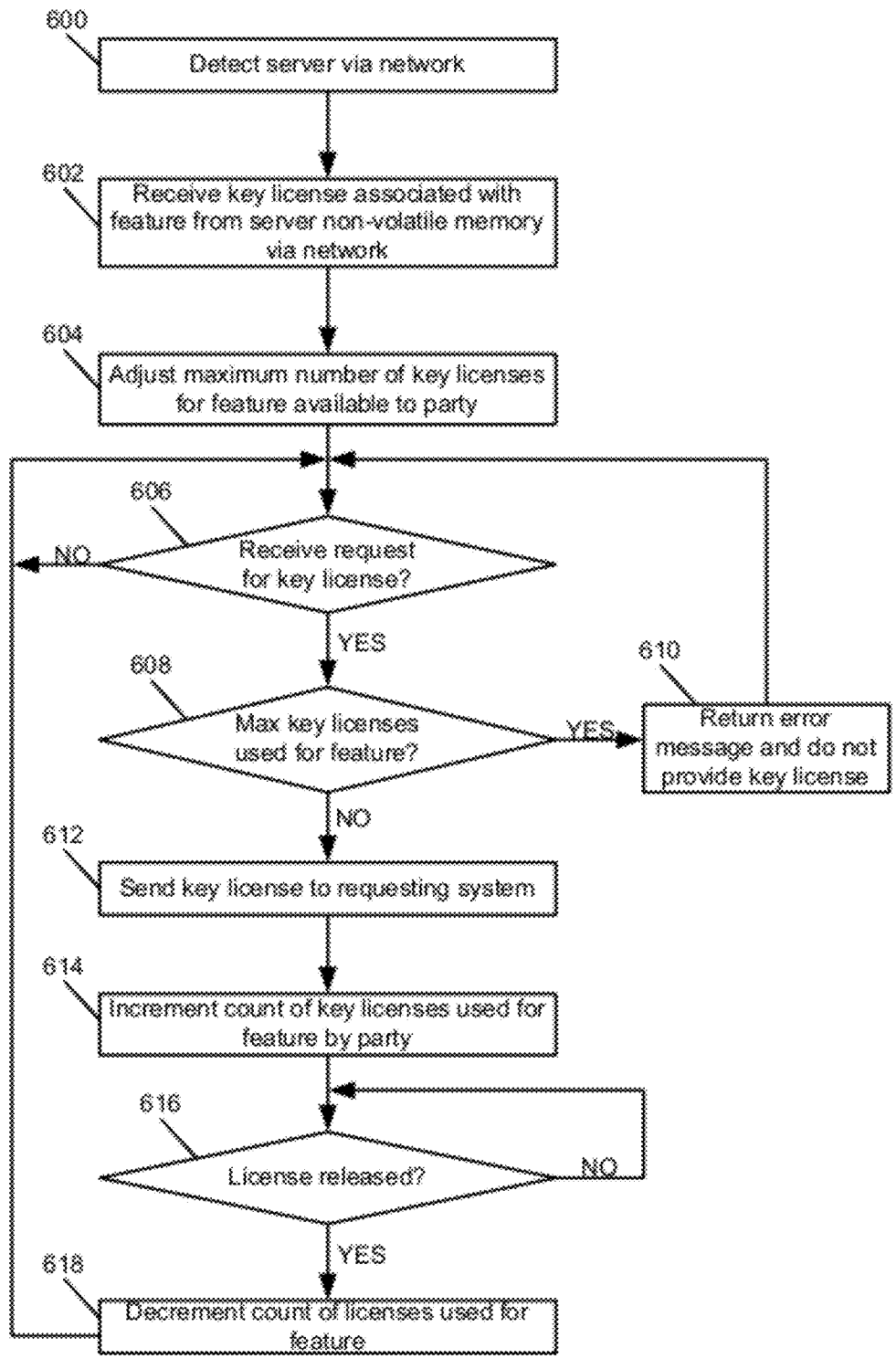
FIG. 6 is a flow diagram illustrating an additional particular embodiment of a method of managing feature enablement in an information handling system.

FIG. 6 illustrates an additional particular embodiment of a method of managing feature enablement in an information handling system. At block 600, a feature enablement information management system detects an information handling system, such as a new server, communicating with a network. In one embodiment, the feature enablement information management system can discover the information handling system. In another embodiment, the information handling system can discover the feature enablement information management system and inform the feature enablement information management system that the information handling system has been deployed at a customer premises, for example.

Moving to block 602, the feature enablement information management system receives a key license from non-volatile memory, such as Basic Input/Output System (BIOS) hardware, at the information handling system via the network. Further, the key license is associated with a feature that the information handling system is adapted to provide. At block 604, in a particular embodiment, the feature enablement information management system can adjust a maximum number of key licenses for the feature that are available to a customer or other party associated with the information handling system. Proceeding to decision node 606, the feature enablement information management system determines whether it has received a request for the key license. The request can be received from the information handling system or another requesting system, such as another information handling system associated with the customer or other party.

If the feature enablement information management system has received a request for the key license, the method advances to decision node 608, and the feature enablement information management system determines whether a maximum number of key licenses is being used for the feature by the party associated with the requesting system. If the feature enablement information management system determines that a maximum number of key licenses is being used for the feature by the party, the method moves to block 610 and the feature enablement information management system denies the key license to the requesting system. In a particular embodiment, the feature enablement information management system can send an error message to the requesting system. The method can then return to decision node 606.

Returning to decision node 608, if the feature enablement information management system determines that fewer than a maximum number of key licenses are being used for the feature by the party, the method moves to block 612, and the feature enablement information management system provides the key license to the requesting system. Proceeding to decision node 614, the feature enablement information management system increments a number of key licenses used for the feature by the party. In an illustrative embodiment, the method can continue to decision node 616, and the feature enablement information management system can determine whether the key license has been released back to the feature enablement information management system by the requesting system. If so, the method can advance to block 618, and the feature enablement information management system can decrement the number of key licenses used for the feature by the party.

Figure 7:
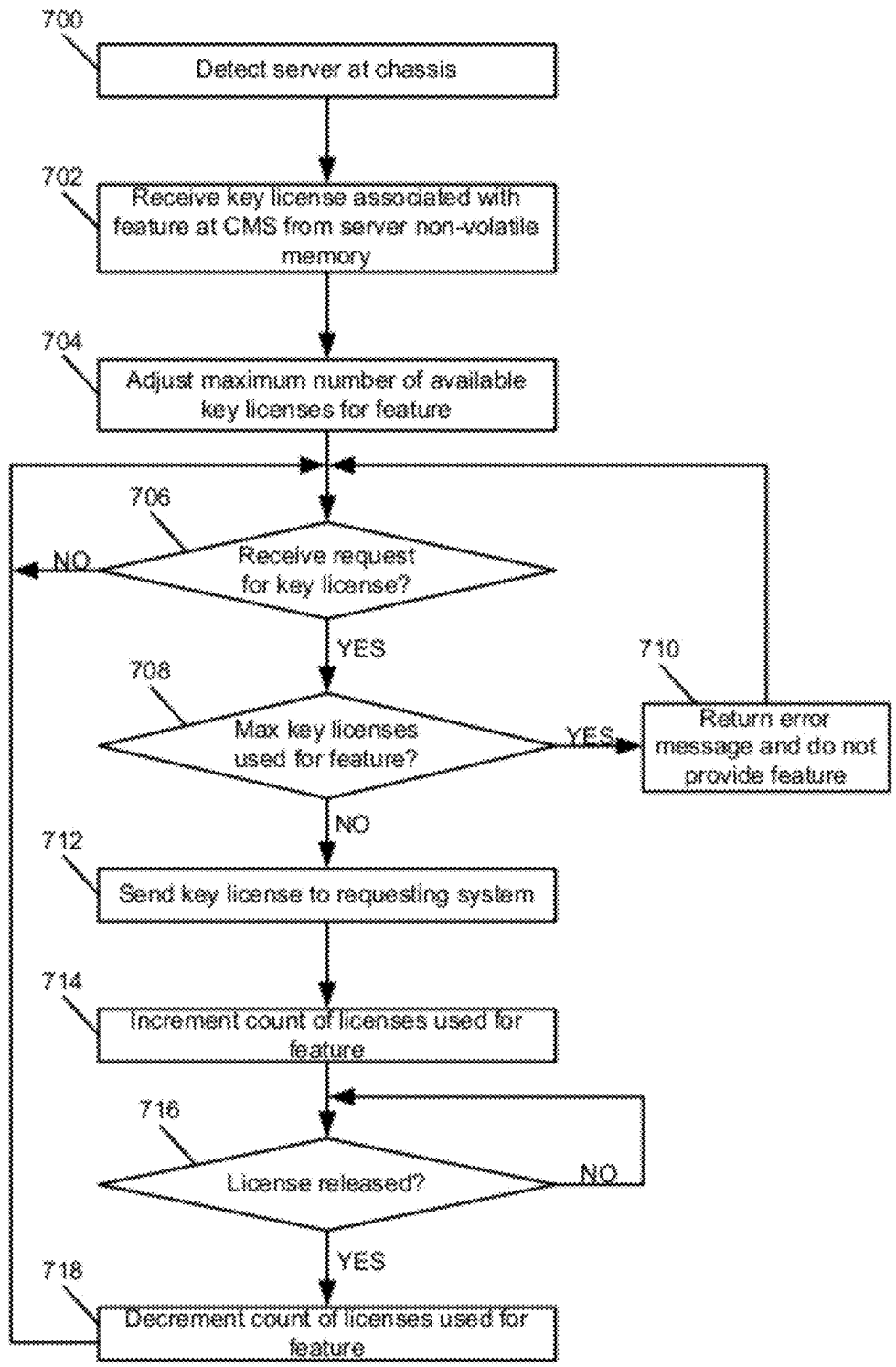
FIG. 7 is a flow diagram illustrating a further particular embodiment of a method of managing feature enablement in an information handling system.

FIG. 7 illustrates a further particular embodiment of a method of managing feature enablement in an information handling system. At block 700, a chassis management system (CMS) at a chassis detects an information handling system, such as a new server, that has been deployed at the chassis. In one embodiment, the CMS can discover the information handling system when the information handling system is deployed at the chassis. In another embodiment, the information handling system can discover the CMS and inform the CMS that the information handling system has been deployed at the chassis.

Moving to block 702, the CMS receives a key license from non-volatile memory, such as Basic Input/Output System (BIOS) hardware, at the information handling system, e.g., via a feature enablement information management service provided at the CMS. The key license is associated with a feature that the information handling system is adapted to provide. At block 704, in a particular embodiment, the CMS can adjust a maximum number of key licenses for the feature that are available to information handling systems deployed at the chassis. For instance, the CMS can set the maximum number at one or increment a previous maximum number by one.

Proceeding to decision node 706, the CMS determines whether it has received a request for the key license. The request can be received from the information handling system or another requesting system, such as another information handling system at the chassis. If the CMS has received a request for the key license, the method advances to decision node 708, and the CMS determines whether a maximum number of key licenses are being used for the feature by information handling systems at the chassis. If the CMS determines that a maximum number of key licenses is being used, the method moves to block 710 and the CMS denies the key license to the requesting system. In a particular embodiment, the CMS can send an error message to the requesting system. The method can then return to decision node 706.

Returning to decision node 708, if the CMS determines that fewer than a maximum number of key licenses are being used for the feature, the method moves to block 712, and the CMS provides the key license to the requesting system. Proceeding to decision node 714, the CMS increments a number of key licenses used for the feature by information handling systems at the chassis. In an illustrative embodiment, the method can continue to decision node 716, and the CMS can determine whether the key license has been released back to the CMS by the requesting system. If so, the method can advance to block 718, and the CMS can decrement the number of key licenses used for the feature by information handling systems at the chassis.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

According to a first aspect, a system to manage feature enablement in an information handling system includes an information handling system including an information handling system including non-volatile memory accessible to a processor. The non-volatile memory stores feature enablement information related to a feature that the information handling system is adapted to provide. The non-volatile memory also stores instructions that are accessible to the processor and executable by the processor to send feature enablement information related to the feature to an external system after the information handling system is deployed and to request the feature enablement information, or other feature enablement information related to the feature, from the external system in response to receiving a request for the feature.

In an embodiment of the first aspect, the non-volatile memory comprises basic input/output system (BIOS) hardware. In another embodiment of the first aspect, the external system comprises a feature enablement information management system communicating remotely with the information handling system via a network. In yet another embodiment of the first aspect, the external system comprises a chassis management system local to the information handling system. In still another embodiment of the first aspect, the non-volatile memory stores instructions that are accessible to the processor and executable by the processor logic to detect the external system after the information handling system is deployed.

In an additional embodiment of the first aspect, the non-volatile memory stores instructions that are accessible to the processor and executable by the processor to provide the requested feature after receiving the feature enablement information, or the other feature enablement information related to the feature, at the information handling system; and not provide the feature to the requesting system after the feature enablement information, or the other feature enablement information related to the feature, is denied by the external system. In a further embodiment of the first aspect, the non-volatile memory stores instructions that are accessible to the processor and executable by the processor to release the feature enablement information, or the other feature enablement information related to the feature, to the external system after the feature is no longer provided.

In another embodiment of the first aspect, the feature enablement information can include a key license. In a further embodiment of the first aspect, the feature enablement information can include a digital certificate, a password, a software token, or any combination thereof.

According to a second aspect, a method of managing feature enablement in an information handling system includes receiving feature enablement information from non-volatile memory at an information handling system. The feature enablement information relates to a feature that the information handling system is adapted to provide. The method also includes storing the feature enablement information and receiving a request for the feature enablement information from a requesting system that is adapted to provide the feature. In an embodiment of the second aspect, the feature enablement information includes a key license and the method includes determining whether a maximum number of key licenses related to the feature are not being used before sending the key license to the requesting system; sending the key license to the requesting system when fewer than the maximum number of key licenses are being used; and denying the key license when the maximum number of key licenses are being used.

In another embodiment of the second aspect, the method also includes incrementing a number of key licenses being used for the feature after sending the key license to the requesting system. In yet another embodiment of the second aspect, the method includes decrementing the number of key licenses being used for the feature after the key license is released by the requesting system. In an additional embodiment of the second aspect, the requesting system is the information handling system. Alternatively, the requesting system can be another information handling system.

In yet another embodiment of the second aspect, the method includes detecting the information handling system. Further, the method can includes sending to the information handling system an instruction to send the feature enablement information to the external system before receiving the feature enablement information.

According to a third aspect, a computer-readable medium including processor-readable instructions that are executable by a processor to perform a method. The method includes sending feature enablement information related to a feature from an information handling system to an external system after the information handling system is deployed, where the feature enablement information is stored at non-volatile memory at the information handling system. The method also includes requesting the feature enablement information, or other feature enablement information related to the feature, from the external system in response to receiving a request for the feature.

In an embodiment of the third aspect, the feature includes application, a utility, a service, an upgrade, or any combination thereof. In yet another embodiment of the third aspect, the method includes receiving from the external system an instruction to send the feature enablement information to the external system before sending the feature enablement information.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to manage feature enablement in an information handling system, the system comprising:
the information handling system including a non-volatile memory accessible to a processor, wherein the non-volatile memory stores feature enablement information related to a feature that the information handling system is to provide, wherein the feature enablement information includes a key license, and wherein the non-volatile memory stores instructions that are accessible to the processor and executable by the processor to:

send the feature enablement information to an external system after the information handling system is deployed, wherein the external system comprises a chassis management system local to the information handling system, and wherein the external system is to provide the feature enablement information to the information handling system and to a requesting system;
request the feature enablement information from the external system in response to receiving a request for the information handling system to provide the feature to the requesting system;
receiving, from the external system, an error message denying the key license when the maximum number of key licenses is being used; and
receive the key license from the external system when fewer than a maximum number of key licenses are being used, wherein a number of key licenses being used for the feature is adjusted after the key license is received from the external system, wherein the number of key licenses being used for the feature is adjusted, by incrementing or decrementing, after the key license is received from the external system.

2. The system of claim 1, wherein the non-volatile memory stores instructions that are accessible to the processor and executable by the processor to:
provide the key license and the requested feature to a requesting system after receiving the feature enablement information from the external system, wherein the requesting system is a same type of device as the information handling system.

3. The system of claim 1, wherein the non-volatile memory stores instructions that are accessible to the processor and executable by the processor to:
receive, from the external system, a denial of the feature enablement information when the maximum number of key licenses are being used;
not provide the feature to a requesting system in response to receiving the denial of the feature enablement information from the external system.

4. The system of claim 1, wherein the external system comprises a feature enablement information management system communicating remotely with the information handling system via a network.

5. The system of claim 1, wherein the non-volatile memory stores instructions that are accessible to the processor and executable by the processor to detect the external system after the information handling system is deployed.

6. The system of claim 1, wherein the non-volatile memory stores instructions that are accessible to the processor and executable by the processor to release the feature enablement information to the external system after the feature is no longer provided.

7. The system of claim 1, wherein the feature enablement information further comprises a digital certificate, a password, a software token, or any combination thereof.

8. The system of claim 1, wherein the non-volatile memory comprises platform-level hardware that stores firmware information.

9. The system of claim 8, wherein the non-volatile memory comprises basic input/output system (BIOS) hardware.

10. A method of managing feature enablement in an information handling system, the method comprising:
receiving, at an external system, feature enablement information from a non-volatile memory at the information handling system after the information handling system is deployed, wherein the feature enablement information relates to a feature that the information handling system is to provide;

storing, at the external system, the feature enablement information that includes a key license, wherein the external system is to provide the feature enablement information to the information handling system and to a requesting system;

receiving a request for the feature enablement information from the requesting system that is to provide the feature;

determining whether a maximum number of key licenses related to the feature are being used;

denying, by issuing an error message, the key license when the maximum number of key licenses is being used;

sending the key license to the requesting system when fewer than the maximum number of key licenses are being used; and adjusting, by incrementing or decrementing, a number of key licenses being used for the feature after sending the key license to the requesting system.

11. The method of claim 10, wherein the requesting system is a same type of device as the information handling system.

12. The method of claim 10, wherein the requesting system is another information handling system.

13. The method of claim 10, wherein the external system comprises a feature enablement information management system communicating remotely with the information handling system via a network.

14. The method of claim 10, further comprising detecting the information handling system.

15. The method of claim 14, further comprising, before receiving the feature enablement information, sending to the information handling system an instruction to send the feature enablement information to the external system.

16. A non-transitory computer-readable medium including processor-readable instructions that are executable by a processor to perform a method, the method comprising:

receiving, at an external system, feature enablement information from a non-volatile memory at the information handling system after the information handling system is deployed, wherein the feature enablement information relates to a feature that the information handling system is to provide;

storing, at the external system, the feature enablement information that includes a key license, wherein the external system is to provide the feature enablement information to the information handling system and to a requesting system;

setting a maximum number of key licenses related to the feature available based on a customer associated with the information handling system;

receiving a request for the feature enablement information from the requesting system that is to provide the feature;

determining whether the maximum number of key licenses related to the feature are being used;

denying, by issuing an error message, the key license when the maximum number of key licenses is being used;

sending the key license to the requesting system when fewer than the maximum number of key licenses are being used; and adjusting, by incrementing or decrementing, a number of key licenses being used for the feature after sending the key license to the requesting system.

17. The non-transitory computer-readable medium of claim 16, wherein the feature includes an application, a utility, a service, an upgrade, or any combination thereof.

18. The non-transitory computer-readable medium of claim 16, wherein the method includes sending to the information handling system an instruction to send the feature enablement information to the external system.

19. The non-transitory computer-readable medium of claim 16, wherein the external system comprises a feature enablement information management system communicating remotely with the information handling system via a network.

20. The non-transitory computer-readable medium of claim 16, wherein the feature enablement information further comprises a digital certificate, a password, a software token, or any combination thereof.

* * * * *